United States Patent
Isbitsky et al.

(10) Patent No.: US 11,391,379 B2
(45) Date of Patent: Jul. 19, 2022

(54) BUTTERFLY VALVE AND BUTTERFLY DISC

(71) Applicant: VELAN INC., Montreal (CA)

(72) Inventors: Stanley Isbitsky, Montreal (CA); Bob Waditschatka, Pointe-Claire (CA); François Jouan, Givors (FR); Nicolas Hervé François Lourdel, Montreal (CA); Gordon Stovel, Pierrefonds (CA)

(73) Assignee: VELAN INC.

( * ) Notice: Subject to any disclaimer, the term of this patent is extended or adjusted under 35 U.S.C. 154(b) by 8 days.

(21) Appl. No.: 16/832,673

(22) Filed: Mar. 27, 2020

(65) Prior Publication Data

US 2020/0309272 A1 Oct. 1, 2020

Related U.S. Application Data

(60) Provisional application No. 62/826,366, filed on Mar. 29, 2019.

(51) Int. Cl.
*F16K 1/226* (2006.01)
*F16K 31/53* (2006.01)

(52) U.S. Cl.
CPC .......... *F16K 1/2261* (2013.01); *F16K 31/535* (2013.01)

(58) Field of Classification Search
CPC ...... F16K 1/2261; F16K 1/222; F16K 31/535; F16K 27/0218; Y10T 137/0525
USPC ........................................................ 251/306
See application file for complete search history.

(56) References Cited

U.S. PATENT DOCUMENTS

| | | | | |
|---|---|---|---|---|
| 3,260,502 A | * | 7/1966 | Plumer | F16K 1/2285 251/306 |
| 3,268,202 A | * | 8/1966 | Murray | F16K 1/2007 251/86 |
| 3,420,500 A | * | 1/1969 | Geiselman | F16K 1/2268 251/288 |
| 4,025,050 A | * | 5/1977 | Manki | F16K 1/2265 251/306 |
| 4,176,823 A | * | 12/1979 | Gliatas | F16K 1/221 251/146 |
| 4,998,708 A | * | 3/1991 | Pavanel | F16K 1/225 251/306 |
| 6,079,695 A | | 6/2000 | Gasaway et al. | |
| 6,595,488 B2 | | 7/2003 | Zwick | |
| 6,722,630 B2 | | 4/2004 | Oberbeck | |
| 6,726,177 B2 | * | 4/2004 | Wang | F16K 1/2263 251/306 |
| 6,766,580 B2 | | 7/2004 | Nanba et al. | |
| 7,264,221 B2 | | 9/2007 | Yeary et al. | |
| 7,744,061 B2 | | 6/2010 | Isogai et al. | |

(Continued)

*Primary Examiner* — Reinaldo Sanchez-Medina
*Assistant Examiner* — Nicole Gardner
(74) *Attorney, Agent, or Firm* — Lavery, De Billy, LLP; Hugh Mansfield

(57) ABSTRACT

An offset butterfly valve comprising a butterfly disc which receives a splined valve stem is disclosed. The butterfly disc is positioned for sealing an annulus formed in the valve housing when the valve stem is rotated from an open position to closed position. Provision of the spline towards the center of the valve stem and the butterfly disc allows the butterfly disc to move along the valve stem. In a particular embodiment a valve seal is secured to the butterfly disc using a securing disc which is threaded into a threaded cylinder concentric with the butterfly disc.

17 Claims, 8 Drawing Sheets

(56) References Cited

U.S. PATENT DOCUMENTS

| | | | |
|---|---|---|---|
| 7,895,989 B2 * | 3/2011 | Bessho | F16K 1/2261 |
| | | | 123/337 |
| 7,984,892 B2 | 7/2011 | Shenk | |
| 8,286,938 B2 | 10/2012 | Helfer et al. | |
| 8,348,235 B2 | 1/2013 | Higgs | |
| 8,381,754 B2 | 2/2013 | Shenk | |
| 8,726,880 B2 | 5/2014 | Stewart et al. | |
| 8,899,257 B2 * | 12/2014 | Grimwade | F02D 9/1015 |
| | | | 137/15.25 |
| 9,022,351 B2 | 5/2015 | Zlindra et al. | |
| 9,127,775 B2 | 9/2015 | Helfer et al. | |
| 9,140,381 B2 | 9/2015 | Zlindra et al. | |
| 9,458,939 B2 | 10/2016 | Hotta et al. | |
| 9,512,925 B2 | 12/2016 | Shanker et al. | |
| 9,574,669 B2 | 2/2017 | Lurk et al. | |
| 9,587,747 B2 | 3/2017 | Helfer et al. | |
| 9,895,776 B2 | 2/2018 | Fan | |
| 2003/0062500 A1 | 4/2003 | Eggleston et al. | |
| 2007/0045586 A1 * | 3/2007 | Shimane | F02M 26/70 |
| | | | 251/306 |
| 2013/0341548 A1 | 12/2013 | Dehais et al. | |
| 2016/0069459 A1 | 3/2016 | Geyer et al. | |
| 2016/0178067 A1 | 6/2016 | Abouelleil | |
| 2017/0089469 A1 | 3/2017 | Gutmann et al. | |
| 2017/0102086 A1 | 4/2017 | Arnold et al. | |
| 2017/0370491 A1 | 12/2017 | Kawahara et al. | |
| 2018/0017170 A1 | 1/2018 | Matthwes, III et al. | |
| 2018/0149272 A1 | 5/2018 | Chen et al. | |

* cited by examiner

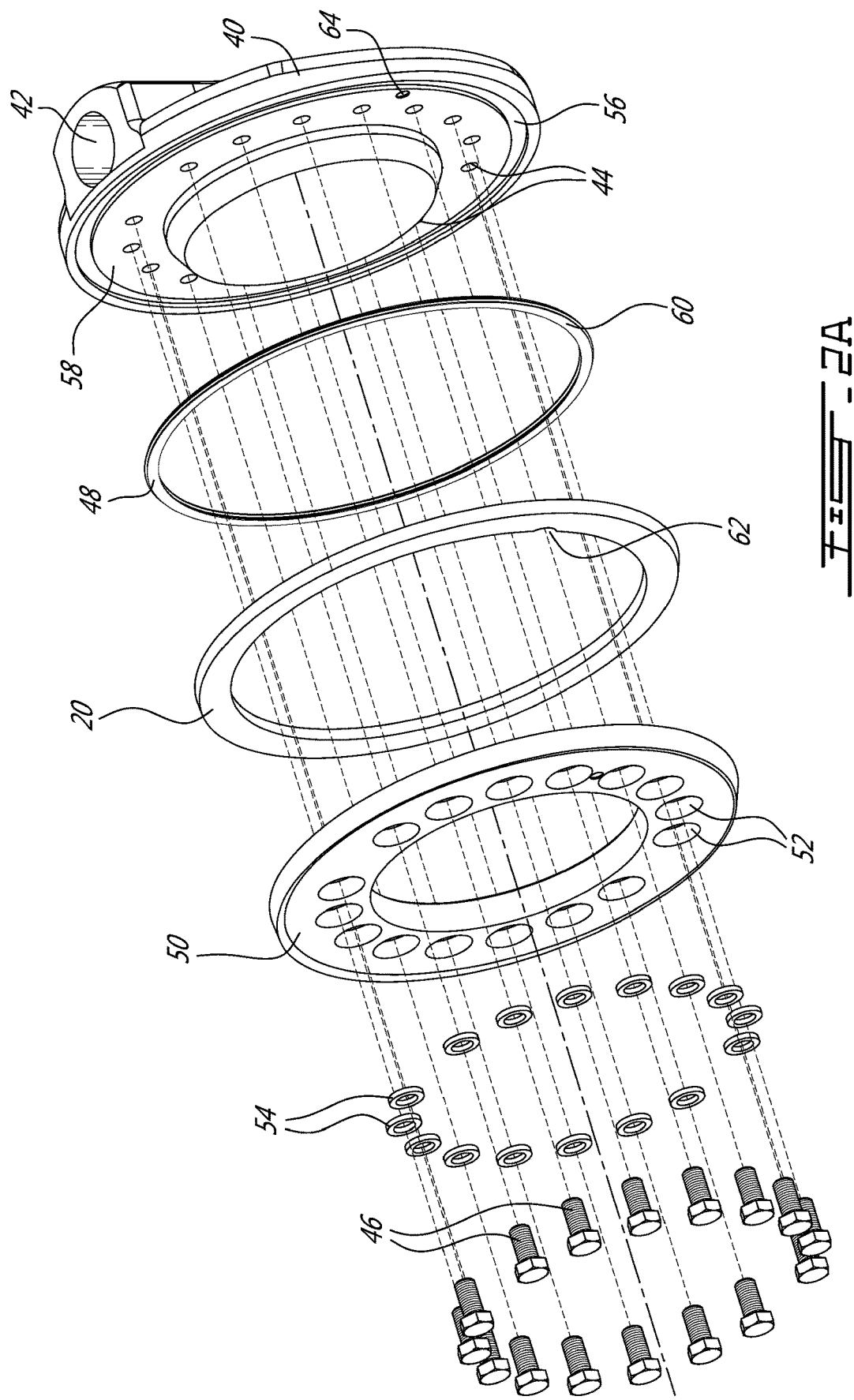

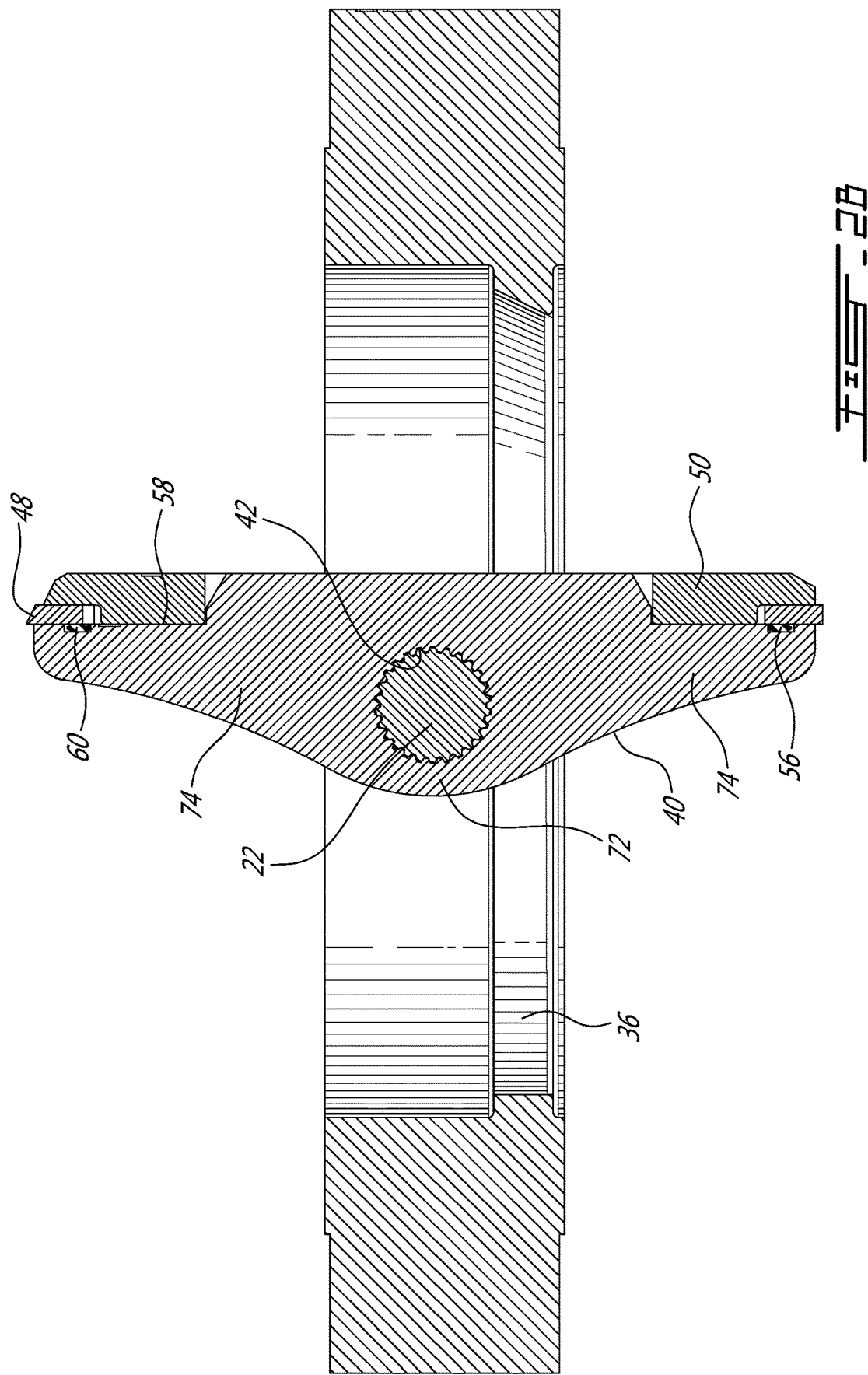

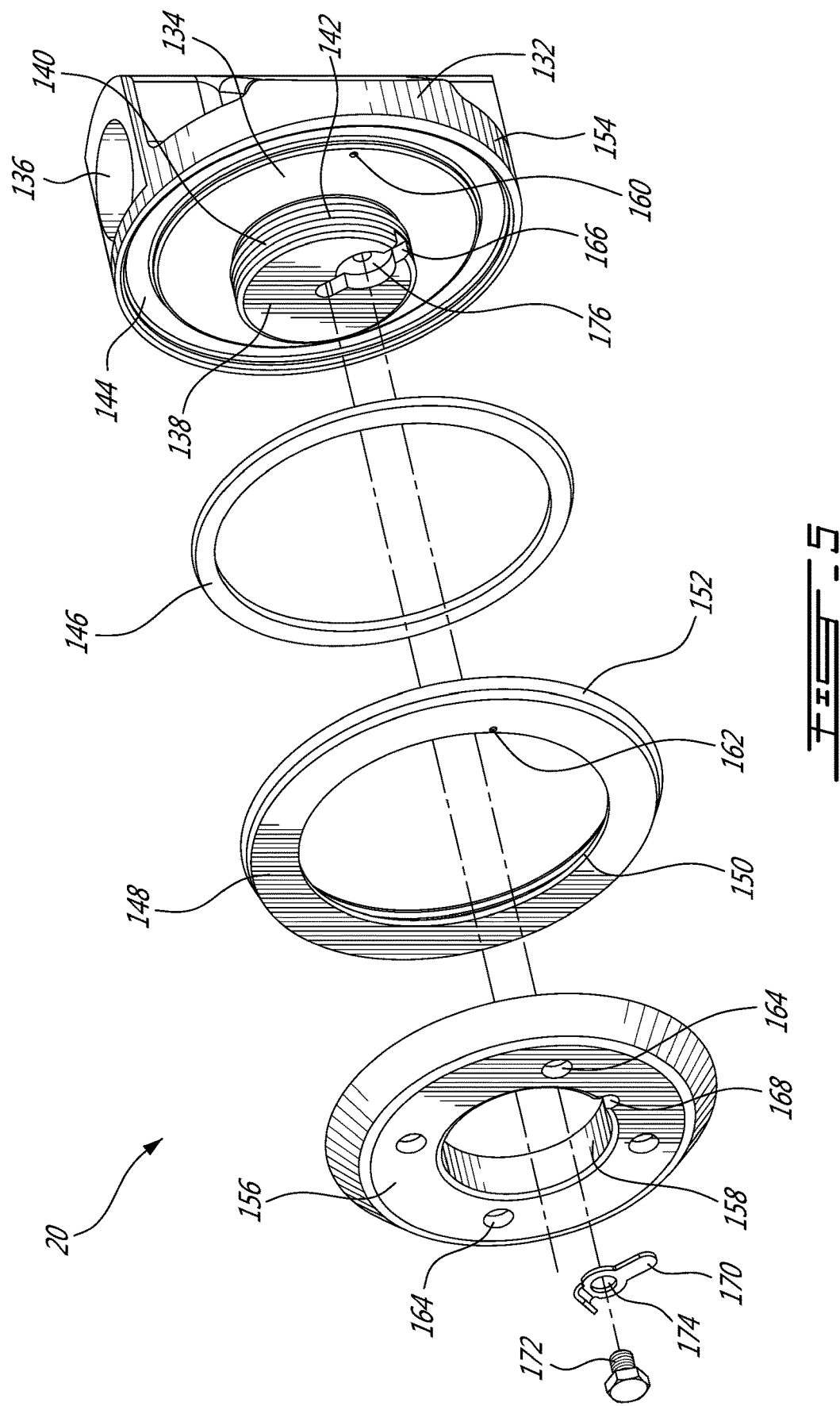

BUTTERFLY VALVE AND BUTTERFLY DISC

CROSS REFERENCE TO RELATED APPLICATIONS

This application claims benefit, under 35 U.S.C. § 119(e), of U.S. provisional application Ser. No. 62/826,366, filed on Mar. 29, 2019, incorporated herein in its entirety by reference.

FIELD OF THE INVENTION

The present invention relates to a butterfly valve and butterfly disc.

BACKGROUND TO THE INVENTION

As known in the art, in butterfly valves a butterfly disc rotates in a flow path to seal the flow path. Achieving tight closure to pressure is largely a function of the contact between the valve seal and the valve seat which in turn is affected by the over all stiffness of the assembly. One drawback with prior art valves is that the disc is held rigidly within the annulus of the valve housing and therefore is susceptible to leaking due to seal wear and the like. Additionally, prior art designs exhibit a degree of deflection in response to torsional and pressure loads, as do prior art discs, which may lead to improper sealing and leakage.

SUMMARY OF THE INVENTION

In order to address the above and other drawbacks there is provided a butterfly valve comprising a valve body comprising an annulus having an inner surface defining an aperture arranged about a flow path and comprising a valve seat and a pair of aligned and opposed first and second stem receiving bores arranged along a bore axis substantially at right angles to the flow path, a butterfly disc positioned within the aperture and comprising a round disc body having a first surface, a ring seal sized for extending beyond an outer periphery of the disc body and engaging with the valve seat to close the aperture, a second surface opposite the first surface comprising a raised part extending substantially completely across the disc body about a third stem receiving bore arranged along the bore axis, the third bore behind and generally in parallel to the first surface, and a female spline positioned within the third bore centrally between a first bore opening and a second bore opening and a re-enforcement extending away at right angles to and on either side of the raised part in the region of the female spline to the outer periphery, the re-enforcement having a width greater than a length of the female spline and an outer surface forming a smooth curved transition between the raised part and the outer periphery, a stem inserted into the first, second and third bores along the bore axis, the stem spanning the aperture and comprising a male spline slideably engaging the female spline to transfer a rotation from the stem to the butterfly disc, a first end extending from the first bore beyond the valve body and a second end secured within the second bore, and an actuator secured to the first stem end, wherein using the actuator the stem/butterfly disc assembly is rotatable between an open position wherein the flow path is open and the butterfly disc is slidable along the stem within the annulus and a closed positioned wherein the butterfly disc self-positions along the stem such that the seal is engaged with the valve seat and the flow path closed.

There is also provided a butterfly disc for use in a butterfly valve having an inner surface defining an aperture arranged about a flow path and comprising a valve stem and a valve seat. The butterfly disc comprises a round disc body comprising a first surface and a second surface opposite the first surface comprising a raised part extending substantially completely across the disc body about a valve stem receiving bore behind and generally in parallel to the first surface, a female spline positioned within the bore centrally between a first bore opening and a second bore opening and a re-enforcement extending away at right angles to and on either side of the raised part in the region of the female spline to a disc body outer periphery, the re-enforcement having a width greater than a length of the female spline and an outer surface forming a smooth curved transition between the raised part and the outer periphery, and a ring seal sized for extending beyond an outer periphery of the disc body and engaging with the valve seat to close the aperture.

Additionally, there is provided a butterfly disc for use in a butterfly valve having an inner surface defining an aperture arranged about a flow path and comprising a valve stem and a valve seat. The butterfly disc comprises a round disc body comprising a front surface, a valve stem receiving bore behind and generally in parallel to the front surface and a raised cylindrical portion concentric to and extending from the front surface, an annular ring seal comprising an inner radius sized for fitting over the raised cylindrical portion and an outer radius extending beyond an outer periphery of the disc body and engaging with the valve seat to close the aperture, and a securing ring comprising a threaded inner edge, the cylindrical central portion further comprising a threaded outer edge complementary to the threaded inner edge and further wherein the securing ring is threadable onto the cylindrical central portion for clamping the seal to the first surface.

BRIEF DESCRIPTION OF THE DRAWINGS

FIG. 2A provides an exploded perspective view of a butterfly disc in accordance with an illustrative embodiment of the present invention;

FIG. 2B provides a sectional view of the open triple offset butterfly valve and butterfly disc along line IIB-IIB in FIG. 1B;

FIG. 5 provides an exploded perspective view of a butterfly disc for a butterfly valve and in accordance with an alternative embodiment of the present invention.

DETAILED DESCRIPTION OF THE ILLUSTRATIVE EMBODIMENTS

Figure 1:
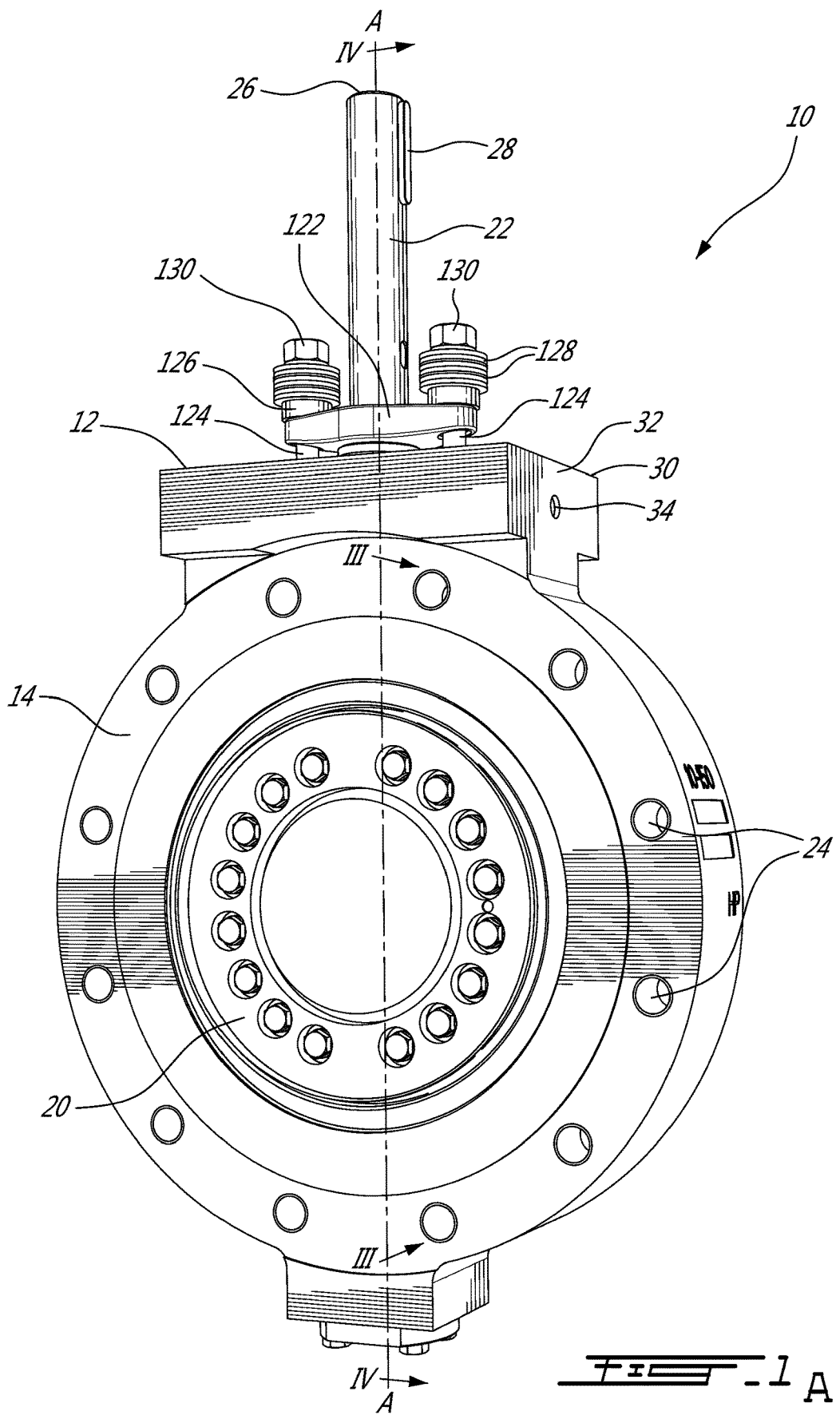
FIG. 1A provides a raised right front perspective view of a closed triple offset butterfly valve and butterfly disc in accordance with an illustrative embodiment of the present invention.
FIG. 1B provides a raised left rear perspective view of an open triple offset butterfly valve and butterfly disc in accordance with an illustrative embodiment of the present invention.

Referring now to FIG. 1A, a butterfly valve, generally referred to using the reference numeral 10, will now be described. The butterfly valve 10 is illustratively of the triple-offset type and comprises a valve body 12 comprising an annulus 14 having an inner surface 16 which defines an aperture 18 through which a liquid, steam or gas can flow (not shown) when the valve 10 is open. In order to open and close the aperture a round butterfly disc 20 is provided which is rotatably held within the aperture using a valve stem 22. The annulus 14 comprises a plurality of bores 24 spaced around the outside which accept bolts or the like (not shown) and via which the valve 10 can be secured to a pipe flange or manifold (also not shown). An actuating end 26 of the valve stem 22 may include a key 28 or other means for interconnection with an actuator (not shown) and such that the butterfly disc 20 may be rotated about a stem axis and the valve 10 opened and closed. In particular embodiments, and depending in part on application, the outer shape of the round butterfly disc 20 may range from substantially circular to elliptical.

Figure 1B:
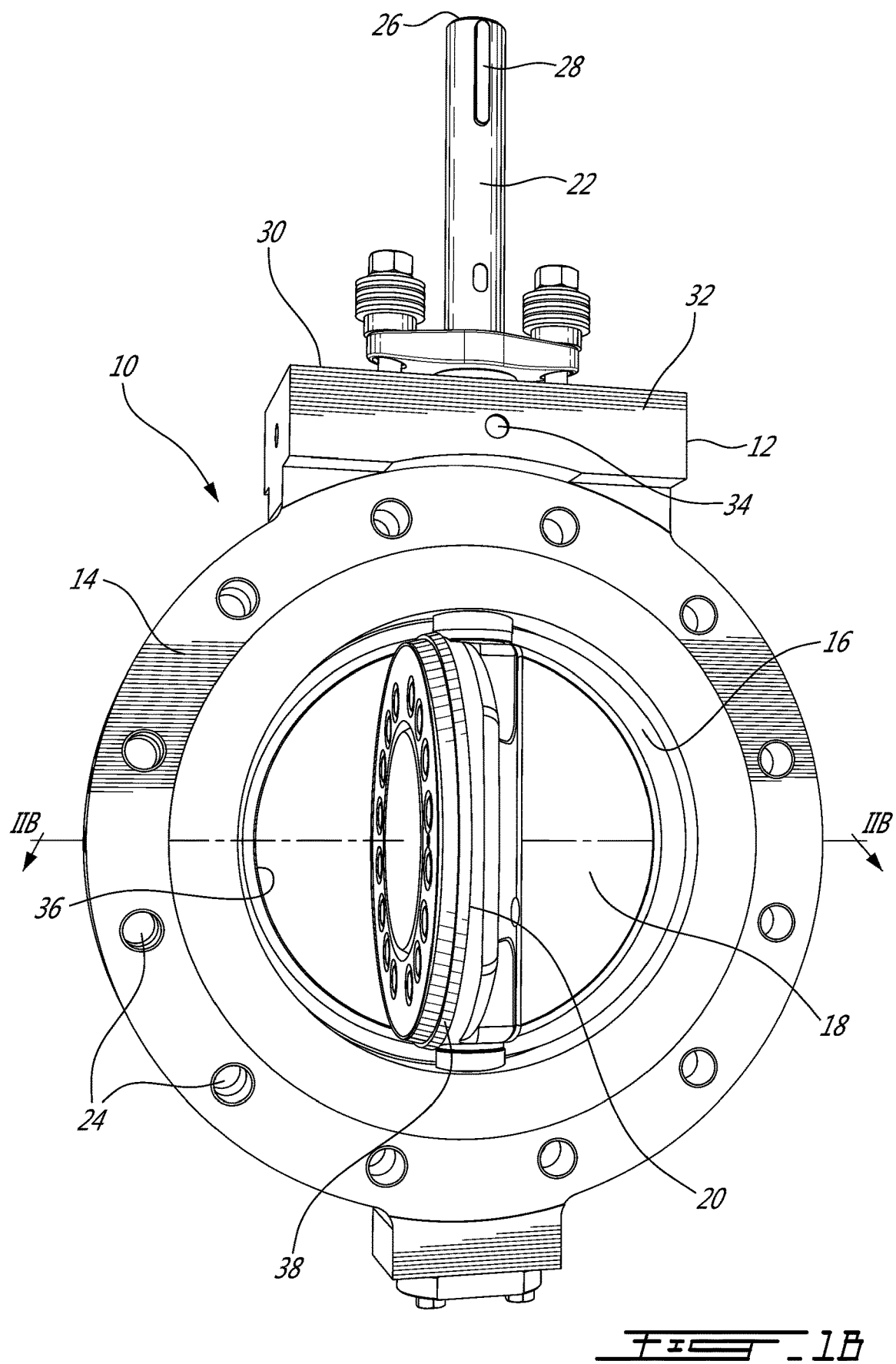

Still referring to FIGS. 1A and 1B, the actuator end 30 of the housing 12 further comprises a pedestal 32 on which an actuator bracket (not shown) may be mounted and in this regard may comprise pre-machined threaded bored (not shown) for receiving actuator mounting bolts or the like (also not shown). Additional markings such as indents 34 or the like may also be provided, for example for providing locating marks indicating whether the valve is in an open or closed position.

Referring to FIG. 1B, the inner surface 16 comprises a valve seat 36 which is machined or otherwise formed to engage with an outer periphery 38 (the disc seal, reference 48 in FIG. 2A) of the butterfly disk 20 when in the closed position.

Referring now to FIGS. 2A and 2B, the butterfly disc 20 comprises a disc body 40 into which a stem receiving bore 42 is machined or otherwise formed for receiving the valve stem 22. The disc body 40 comprises a plurality of threaded holes 44 each which receive one of a plurality of bolts 46. A disc seal 48 is secured to the disc body 40 by a carrier/retaining ring 50 within which are machined or otherwise formed a plurality of holes 52. The retaining ring 50 is retained securely against the disc body 40 by the plurality of bolts 46 and respective ones of a plurality washers 54. A groove 56 is formed in a substantially flat surface 58 of the disc body 40 which receives a gasket 60 illustratively manufactured from a heat and pressure resistant material such as graphite. Given the triple offset nature of the valve 10, as the disc seal 48 comprises a non-uniform outer shape such that it can properly engage the valve seat 36, a keying reference 62 may be machined or otherwise formed in the disc seal 48 which during assembly is oriented with a corresponding keying reference 64 in the disc body 40.

Figure 3:
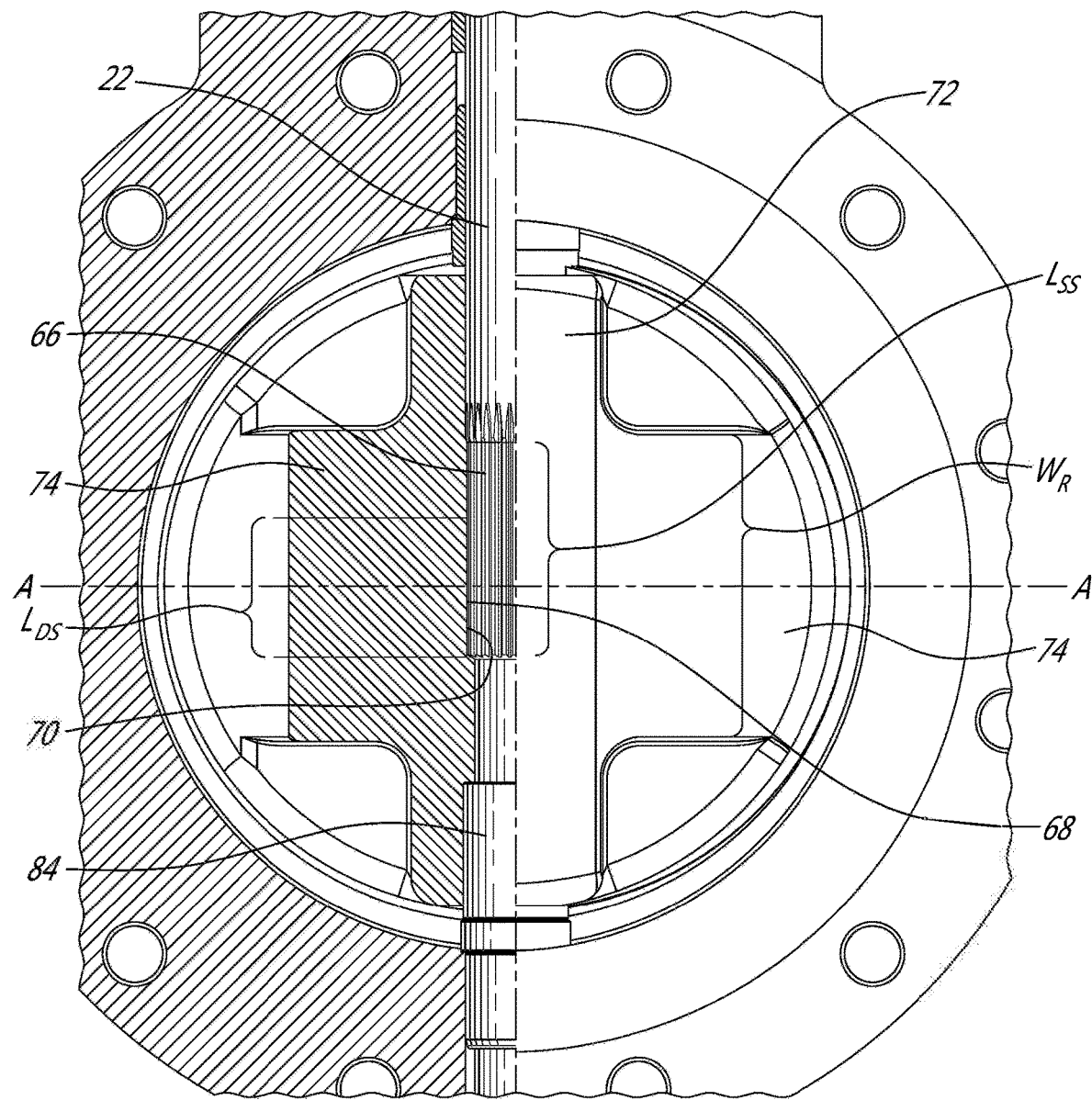
FIG. 3 provides a partial sectional view along line III-III in FIG. 1A.

Referring now to FIG. 3 in addition to FIG. 2B, as discussed above the valve stem 22 is received in a stem receiving bore 42 in the disc body 40. The valve stem 22 comprises a spline 66 which on assembly with the disc body 40 engages a corresponding spline 68 machined on the inner surface 70 of the stem receiving bore 42. The disc body spline 68 straddles the centre A-A of the disc body 40. The valve stem 22, stem receiving bore 42 and splines 66, 68 are machined or otherwise formed such that they fit snugly together while allowing the disc body 40 to travel, or float, during use along the valve stem 22. The disc body 40 comprises a raised portion 72 about the stem receiving bore 42 and a pair of opposed wing-like re-enforcements 74 on either side of the disc body spline 68 which increase stiffness of the disc body 40. In this regard, the width $W_R$ of each re-enforcement 74 is greater than the length $L_{DS}$ of the disc body spline 68 and in a particular embodiment could be substantially the same as the diameter of the buttery disc 20. Additionally, the length $L_{SS}$ of the stem spline 66 is illustratively at least the same length as that of the disc spline 68. Provision of the wing-like re-enforcements 74 together with the offset design of the butterfly disc 20 allows the diameter of the valve stem to be increased, thereby improving the assembly's resilience to torsional forces and sealing.

Still referring to FIG. 3, provision of the stem spline 66 and the disc spline 68 straddling the centre of the disc body 40 provides for a balanced assembly. This, combined with the increased disc body stiffness provided by the size and positioning of the re-enforcements 74, reduces the amount of backlash versus existing designs thereby improving control of the valve 10. This allows, for example, a higher torque to be applied to the valve stem 22 on closing which improves sealing. Additionally, as the disc body 40 is able to slide along the valve stem 22, the engagement between the disc seal 48 and the valve seat 36 is improved and which otherwise may have been affected by small changes in the relationship between the disc seal 48 and the valve seat 36 due to changes in pressure, temperature or wear and tear.

Still referring to FIG. 3, the smooth transition from the raised portion 72 via the re-enforcements 74 to the periphery of the disc body 40 combined with the offset design helps balance the flow on either side of the disc body 40 such that it remains substantially smooth, and aids in equalising pressure on the disc body 40 when the valve 10 is open. This additionally reduces the potential of backlash and vibration as well as reducing head loss over previous designs thereby improving both operation and performance.

Figure 4A:
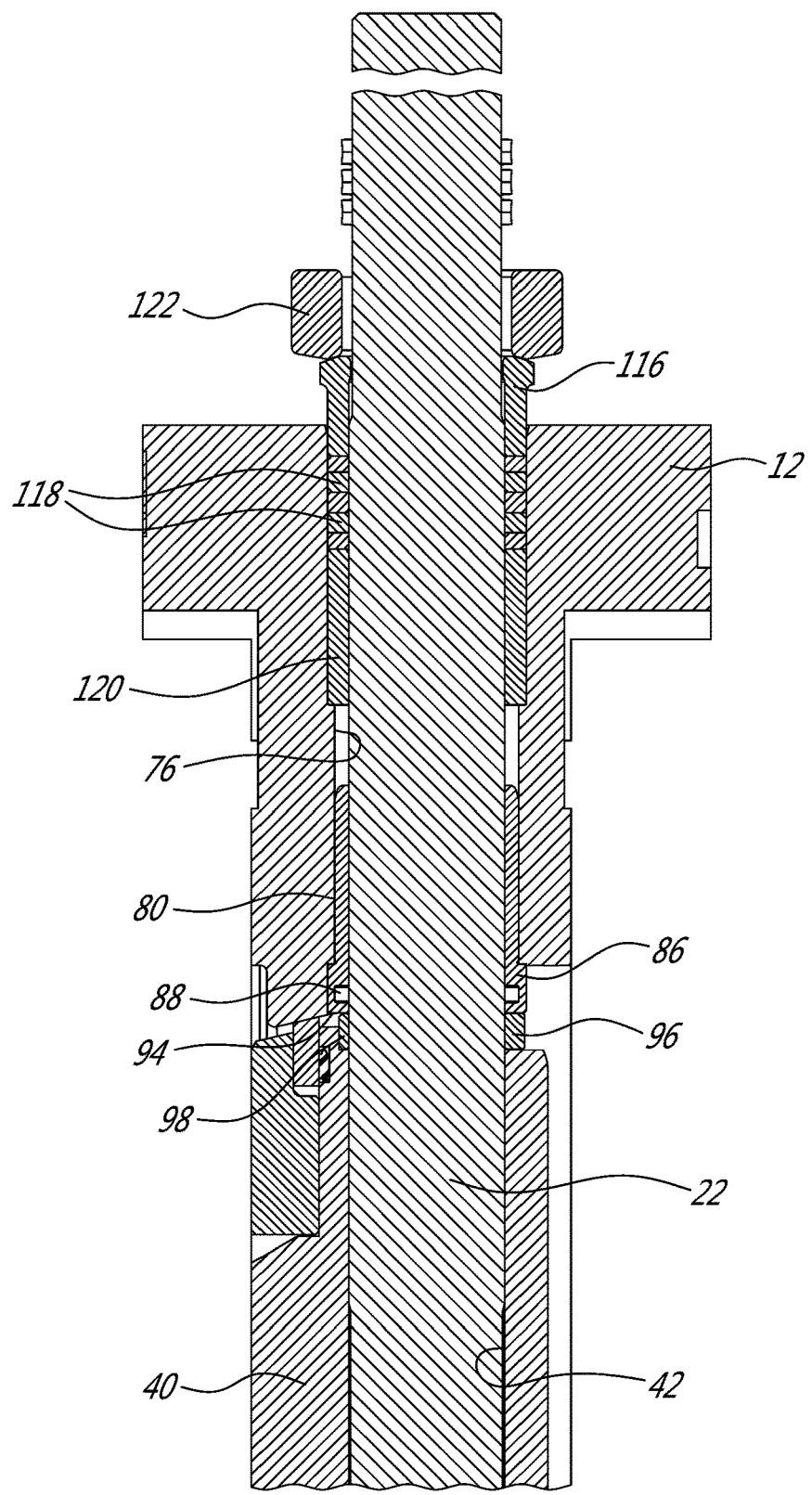
FIG. 4A provides a partial sectional view along line IV-IV in FIG. 1A.
Figure 4B:
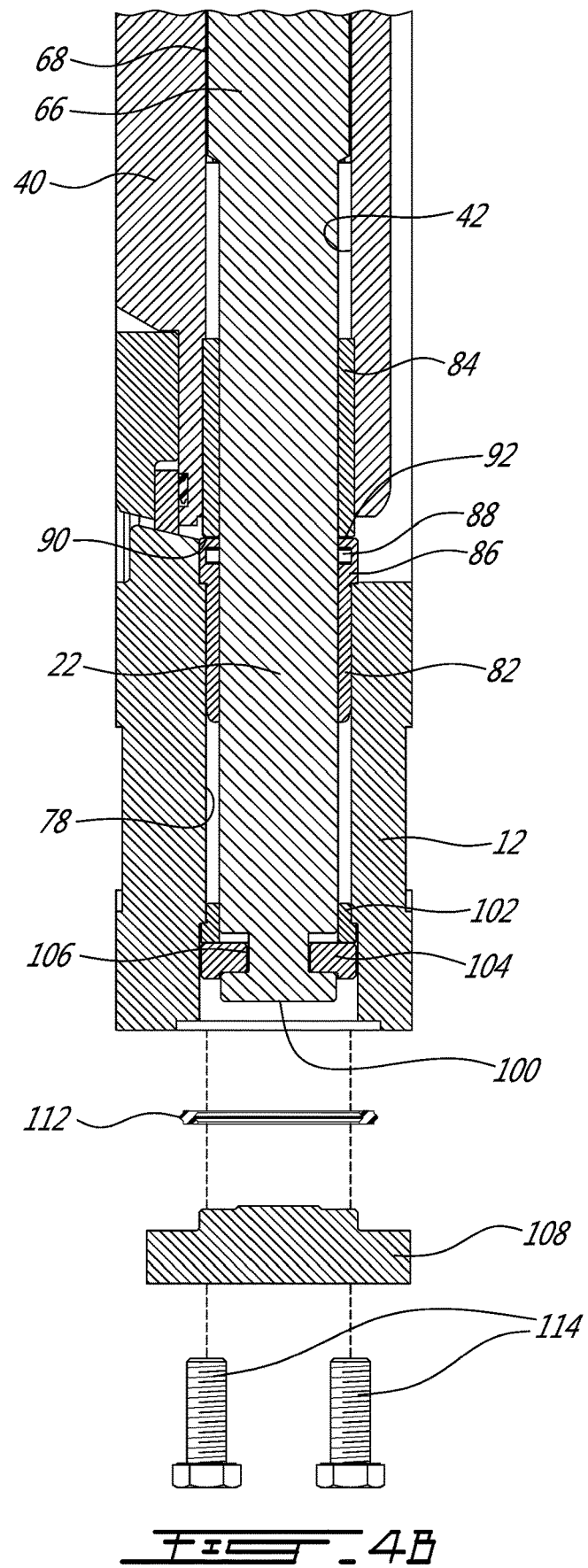
FIG. 4B provides a partial sectional view along line IV-IV in FIG. 1A.

Referring to FIGS. 4A and 4B, the valve body 12 comprises a first valve stem receiving bore 76 and a second valve stem receiving bore 78 each which receive a respective one of a first and second bushing 80, 82. A third bushing 84 is received within the stem receiving bore 42 in the disc body 40. The bushings 80, 82, 84 are illustratively manufactured from a material such as stainless steel and in a particular embodiment may be subject to a surface treatment to increase their hardness and resistance to wear, such as through nitriding or the like. Each of the first and second bushing 80, 82 comprises a raised flange 86 which receives a flange packing 88 which engages the outer surface of the valve stem 22 to limit the escape of fluid or gas or the like. The bushings 80, 82, 84 are placed into their respective bores 76, 78, 42 and retained therein via a friction fit. In order to reduce wear, and as during operation the disc body 40 may float on the valve stem 22, the travel of the disc body 40 along the valve stem 22 is limited in one direction by an outer surface 90 of the third bushing 84 engaging an outer surface 92 of the second bushing 82 and in another direction by an outer surface 94 of the first bushing 80 engaging a resilient hardened collar 96 between the disc body 40 and the first bushing 80. The collar 96 is illustratively keyed by means of a flat surface 98 to the disc body 40 such that the collar 96 rotates with the disc body 40 about the valve stem axis. Provision of the bushings 80, 82 immediately adjacent the disc body 40 and proximate the inner surface 16 of the annulus 14 reduces bending forces exerted on the valve stem 22 thereby improving sealing of the assembly.

Still referring to FIGS. 4A and 4B, during assembly the bushings 80, 82 are installed in their respective valve stem receiving bores 76, 78, the third bushing installed within the stem receiving bore 42 and the disc body 40 placed within the aperture 18 with the stem receiving bore 42 aligned with the first valve stem receiving bore 76 and the second valve stem receiving bore 78. The collar 96 is placed between the disc body 40 and the first bushing 80 and also aligned with the bores 42, 76, 78. The non-actuating end 100 of the valve stem 22 is then inserted via the first valve stem receiving bore 76 and via the stem receiving bore 42 into the second valve stem receiving bore 78 and such that the non-actuating end 100 of the valve stem 22 exits the valve body 12 via a seal 102 while the valve stem spline 66 engages the disc body spline 68.

Still referring to FIGS. 4A and 4B, a retaining clip 104 is secured within a clip receiving groove 106 machined or otherwise formed towards the non-actuating end 100 of the valve stem 22. The non-actuating end 100 of the valve stem 22 is then retracted into the valve body 12. Travel of the valve stem 22 into the valve body 12 is limited by the retaining clip 104 which engages the seal 102. A plate 108 is placed over the outer opening 110 of the second valve stem receiving bore 78 to limit the travel outwards of the valve stem 22 and a gasket 112 or O-ring or the like. The plate 108 is secured to the valve body 12 using a fastening means such as bolts 114 or the like which engage with respective threaded bores (not shown) in the valve body 12.

Still referring to FIGS. 4A and 4B, following installation of the valve stem 22 in the valve body 12, a packing comprising a gland bushing 116 and gland packing 118, 120 is inserted into the first valve stem receiving bore 76 and secured in place by a gland flange 122 which presses against the gland packing 118, 120. The gland flange 122 is secured to the pedestal 32 via a pair of threaded rods 124 which each receive a collar 126, a stack of disc springs 128, such as Belleville washers, and a nut 130. Tension on the stacks of disc springs 128 can be adjusted using the nut 130. The stack of disc springs 128 provides for some movement of the gland bushing 116 and gland packing 118, 120 such that gland packing 118, 120 can adjust to changes in temperature and pressure and the like.

Referring now to FIG. 5 in addition to FIG. 1A, in an alternative embodiment of a butterfly disc 20, and one which is particularly well suited for smaller butterfly valves 10 where the diameter of the annulus 14 is less than about 4 inches, the round disc body 132 comprises a front surface 134 and a valve stem receiving bore 136 arranged behind the front surface 134 and in parallel to the front surface 134. A raised cylindrical portion 138, concentric with the round disc body 132, extends away from the front surface 134 and comprises an outer edge 140 machined or otherwise formed with a thread 142. The front surface 134 further comprises a circular grove 144 which receives a gasket 146.

Still referring to FIG. 5, an annular disc seal 148 comprising an inner radius 150 sized to fit over the raised cylindrical portion 138 and an outer radius 152 extending beyond an outer edge 154 of the round disc body 132 is provided. A seal securing ring 156 comprising a threaded inner edge 158 is threadable onto the raised cylindrical portion 138 for clamping the disc seal 148 against the front surface 134 and the gasket 146. In order to insure that the disc seal 148 is oriented correctly during assembly vis-à-vis the round disc body 132, a first keying feature 160 is provided on the front surface 134 which is alignable with a second keying feature 162 on the disc seal 148.

Still referring to FIG. 5, the seal securing ring 156 comprises features 164 for receiving a tool or the like (not shown), such as an adaptor for a torque wrench or the like (also not shown), such that the seal securing ring 156 can be tightened onto the raised cylindrical portion 138. A lock comprising a first slot/notch 166 in the outer edge 140 of the raised cylindrical portion 138 and a second slot/notch 168 in the threaded inner edge 158 of the securing ring 156 additionally comprises a key 170 which is insertable into the first and second slots/notches 166, 168 when they are aligned and a bolt 172 threadable through a hole 174 in the key and into a threaded bore 176 in the first slot/notch 166.

Still referring to FIG. 5, during installation of the seal securing ring 156 onto the raised cylindrical portion 138, the seal securing ring 156 is tightened using a tool until the disc seal 148 is clamped against the front surface 134 by the seal securing ring 156 and the first slot/notch 166 is aligned with the second slot/notch 168. The key 170 is then placed across the first slot/notch 166 and the second slot/notch 168 and secured in place by threading the bolt 172 via the hole 174 into the threaded bore 176. A person of ordinary skill in the art will now understand that the installed key 170 prevents the installed seal securing ring 156 from rotating and loosening. Clamping the disc seal 148 to the front surface 134 in this manner distributes the clamping force substantially equally around the periphery of the disc seal 148.

Although the present invention has been described hereinabove by way of specific embodiments thereof, it can be modified, without departing from the spirit and nature of the subject invention as defined in the appended claims.

We claim:

1. A butterfly valve comprising:
   a valve body comprising an annulus having an inner surface defining an aperture arranged about a flow path and comprising a valve seat and a pair of aligned and opposed first and second stem receiving bores arranged along a bore axis substantially at right angles to said flow path;
   a butterfly disc positioned within said aperture and comprising a round disc body having a first surface, a ring seal sized for extending beyond an outer periphery of said disc body and engaging with said valve seat to close said aperture, a second surface opposite said first surface comprising a raised part extending substantially completely across said disc body about a third stem receiving bore arranged along said bore axis, said third bore behind and generally in parallel to said first surface, and a female spline positioned within said third bore centrally between a first bore opening and a second bore opening and a re-enforcement extending away at right angles to and on either side of said raised part in the region of said female spline to said outer periphery, said re-enforcement having a width greater than a length of said female spline and an outer surface forming a smooth curved transition between said raised part and said outer periphery;
   a stem inserted into said first, second and third bores along said bore axis, said stem spanning said aperture and comprising a male spline slideably engaging said female spline to transfer a rotation from said stem to said butterfly disc, a first end extending from said first bore beyond said valve body and a second end secured within said second bore; and
   an actuator secured to said first stem end, wherein using said actuator said butterfly disc is rotatable between an open position wherein said flow path is open and said butterfly disc is slidable along said stem within said annulus and a closed positioned wherein said butterfly disc self-positions along said stem such that said seal is engaged with said valve seat and said flow path closed.

2. The butterfly valve of claim 1, further comprising a ring shaped carrier for securing said seal to said first surface.

3. The butterfly valve of claim 2, wherein said ring shaped carrier comprises a plurality of spaced holes, each of said spaced holes alignable with a respective one of a plurality threaded holes in said first surface and further comprising a plurality of bolts threaded into respective ones of said threaded holes via respective ones of said spaced holes, said bolts thereby securing said ring shaped carrier and said seal to said first surface.

4. The butterfly valve of claim 2, wherein an inner edge of said carrier is threaded, wherein said first surface comprises a raised cylindrical central portion comprising a threaded outer edge complementary to said inner edge and further wherein said carrier is threadable onto said cylindrical central portion for securing said ring shaped carrier and said seal to said first surface.

5. The butterfly valve of claim 4, further comprising a lock for preventing said carrier once installed on said central portion from being removed.

6. The butterfly valve of claim 5, further comprising a first slot in said outer edge and a second slot in said inner edge such that when said carrier is installed on said cylindrical portion said first slot and said second slot are co-aligned, and further wherein said lock comprises a key insertable into said coaligned first and second slots thereby preventing said carrier from being rotated vis-A-vis said cylindrical portion.

7. The butterfly valve of claim 4, wherein said ring shaped carrier comprises a plurality of features therein for engaging an installation/removal tool.

8. A butterfly disc for use in a butterfly valve having an inner surface defining an aperture arranged about a flow path and comprising a valve stem and a valve seat, the butterfly disc comprising:
   a round disc body comprising a first surface and a second surface opposite said first surface comprising a raised part extending substantially completely across said disc body about a valve stem receiving bore behind and generally in parallel to said first surface, a female spline positioned within said bore centrally between a first bore opening and a second bore opening and a re-enforcement extending away at right angles to and on either side of said raised part in the region of said female spline to a disc body outer periphery, said re-enforcement having a width greater than a length of said female spline and an outer surface forming a smooth curved transition between said raised part and said outer periphery; and
   a ring seal sized for extending beyond an outer periphery of said disc body and engaging with the valve seat to close the aperture.

9. The butterfly disc of claim 8, further comprising a retaining ring for securing said seal to said first surface.

10. The butterfly disc of claim 9, wherein said retaining ring comprises a plurality of spaced holes, each of said spaced holes alignable with a respective one of a plurality threaded holes in said first surface and further comprising a plurality of bolts threaded into respective ones of said threaded holes via respective ones of said spaced holes, said bolts thereby securing said retaining ring and said seal to said first surface.

11. The butterfly disc of claim 9, wherein an inner edge of said retaining ring is threaded, wherein said first surface comprises a raised cylindrical central portion comprising a threaded outer edge complementary to said inner edge and further wherein said retaining ring is threadable onto said cylindrical central portion for securing said retaining ring and said seal to said first surface.

12. The butterfly disc of claim 11, further comprising a lock for preventing said retaining ring once installed on said central portion from being removed.

13. The butterfly disc of claim 12, further comprising a first slot in said outer edge and a second slot in said inner edge such that when said retaining ring is installed on said cylindrical portion said first slot and said second slot are co-aligned, and further wherein said lock comprises a key insertable into said coaligned first and second slots thereby preventing said retaining ring from being rotated vis-à-vis said cylindrical portion.

14. The butterfly disc of claim 11, wherein said retaining ring comprises a plurality of features therein for engaging an installation/removal tool.

15. A butterfly disc for use in a butterfly valve having an inner surface defining an aperture arranged about a flow path and comprising a valve stem and a valve seat, the butterfly disc comprising:
   a round disc body comprising a front surface, a valve stem receiving bore behind and generally in parallel to said front surface and a raised cylindrical portion concentric to and extending from said front surface;
   an annular ring seal comprising an inner radius sized for fitting over said raised cylindrical portion and an outer radius extending beyond an outer periphery of said disc body and engaging with the valve seat to close the aperture;
   a securing ring comprising a threaded inner edge; and
   a lock for preventing said securing ring once installed on said central portion from being removed;
   said cylindrical central portion further comprising a threaded outer edge complementary to said threaded inner edge and further wherein said securing ring is threadable onto said cylindrical central portion for pressing said seal against said front surface.

16. The butterfly disc of claim 15, wherein said securing ring comprises a plurality of features therein for engaging an installation/removal tool.

17. The butterfly disc of claim 15, further comprising a first notch in said outer edge and a second notch in said inner edge such that when said securing ring is installed on said cylindrical portion said first notch and said second notch are co-aligned, and further wherein said lock comprises a key insertable into said coaligned first and second notches thereby preventing said securing ring from being rotated vis-à-vis said cylindrical portion.

* * * * *